United States Patent
Kotani et al.

(10) Patent No.: US 7,189,942 B2
(45) Date of Patent: Mar. 13, 2007

(54) CAR POWER SOURCE APPARATUS

(75) Inventors: Yasuo Kotani, Kasai (JP); Yoshihiko Ninomiya, Kakogawa (JP); Masaki Yugo, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 97 days.

(21) Appl. No.: 11/087,767

(22) Filed: Mar. 24, 2005

(65) Prior Publication Data
US 2005/0218136 A1   Oct. 6, 2005

(30) Foreign Application Priority Data
Mar. 31, 2004   (JP)   ............... 2004-105915

(51) Int. Cl.
*B60L 1/02* (2006.01)
(52) U.S. Cl. ..................... 219/202; 219/209
(58) Field of Classification Search .............. 219/209, 219/200, 202, 225; 429/148, 156
See application file for complete search history.

(56) References Cited

U.S. PATENT DOCUMENTS

| | | | |
|---|---|---|---|
| 3,156,813 A * | 11/1964 | Trainor ..................... 219/526 |
| 5,115,116 A * | 5/1992 | Reed ......................... 219/202 |
| 5,215,834 A * | 6/1993 | Reher et al. ................. 429/62 |
| 5,279,459 A * | 1/1994 | Single, II ................... 237/2 A |
| 5,281,792 A * | 1/1994 | Lee et al. .................... 219/209 |
| 5,624,003 A * | 4/1997 | Matsuki et al. ............ 180/65.1 |
| 5,834,131 A * | 11/1998 | Lutz et al. .................... 429/7 |
| 5,948,298 A * | 9/1999 | Ijaz ............................ 219/209 |
| 5,994,669 A * | 11/1999 | McCall ...................... 219/209 |
| 6,781,349 B2 * | 8/2004 | Kimura et al. ............. 320/150 |
| 7,014,949 B2 * | 3/2006 | Kanai et al. ................ 429/148 |
| 2003/0162084 A1 * | 8/2003 | Shigeta et al. ............... 429/62 |

FOREIGN PATENT DOCUMENTS

JP    2003-223938    8/2003

* cited by examiner

*Primary Examiner*—Robin Evans
*Assistant Examiner*—Vinod Patel
(74) *Attorney, Agent, or Firm*—Wenderoth, Lind & Ponack, L.L.P.

(57) ABSTRACT

The car power source apparatus is provided with a car driving battery, a heater which heats the driving battery, a control circuit which controls power to the heater, and a temperature sensor to detect battery temperature and issue a detected temperature signal to the control circuit. The control circuit is provided with a timer which stores a warming-time to maintain the driving battery in a warmed-up condition via the heater after the car ignition switch has been turned off. During the warming-time, which is until the timer times-out with the ignition switch turned to the off state, the control circuit controls power to the heater to maintain the driving battery in a warmed-up condition.

8 Claims, 11 Drawing Sheets

CAR POWER SOURCE APPARATUS

BACKGROUND OF THE INVENTION

This invention relates to a car power source apparatus provided with a heater to increase the temperature of the driving battery that powers the electric drive motor of a vehicle, such as an automobile, when temperatures are low.

When temperatures become extremely low, battery output decreases and sufficient performance cannot be obtained. Consequently, when a hybrid car is used in a location of extreme cold and the temperature of the driving battery becomes low, battery performance is not sufficient to start the car. A hybrid car is designed to normally run on both an engine and an electric motor. If performance of the driving battery decreases and power from the motor is insufficient, the hybrid car cannot operate normally. This drawback can be resolved by warming-up (heating) the battery. To realize this, the present applicant developed a power source apparatus which warms-up rechargeable batteries via a heater (refer to Japanese Patent Application Disclosure 2003-223938).

The power source apparatus disclosed in this patent reference is provided with a driving battery comprising a plurality of rechargeable batteries, and a heating plate, with a heater mounted on it, to warm-up (heat) the rechargeable batteries of the driving battery. The heating plate is disposed in close proximity to the rechargeable batteries to allow efficient heating of those rechargeable batteries. Electric current is passed through the heating plate heater of this power source apparatus to heat the heater via Joule heating. Many heaters are disposed in close proximity to many rechargeable batteries to heat those batteries.

A power source apparatus, which warms-up (heats) the driving battery when the car is started in an extremely cold climate location, where outside air temperature drops, for example, below −20° C., has the drawback that battery warm-up (heating) takes considerable time. In principle, this drawback could be eliminated by increasing heater energy consumption. However, if heater energy consumption were increased, heater temperature would become abnormally high, the board attached to the heater and parts in the vicinity would be over-heated, and heat damage such as deformation could result. As a practical matter, heater energy consumption cannot be increased. Further, in the case where current flow for the heater is from the driving battery, the electrical characteristics of that battery are significantly degraded due to the low temperature. Considering degradation of battery discharge characteristics when current is supplied to the heater, a reduction in heater energy consumption is needed. The heater can also be electrically powered via commercial power by connecting a power cord to a commercial power outlet, and not depending on the driving battery as a power source. However, in this method, warm-up (heating) is troublesome because a power cord must be connected to an electrical outlet. Further, even in this method, warm-up (heating) must be performed while preventing over-heating of the heater, and considerable time is required before battery temperature reaches a set temperature. Finally, since heat capacity of the battery is considerable, large amounts of heat energy are required to warm-up (heat) the entire battery, and this also contributes to long battery warm-up (heating) time.

The present invention was developed with the object of resolving these types of prior art drawbacks. Thus it is a primary object of the present invention to provide a car power source apparatus which can immediately start the car in a location of extreme cold when the ignition key is turned on, without having to warm-up (increase the temperature of) the battery. It is a further object to provide a car power source apparatus which requires no troublesome operations, such as connecting a power cord to an electrical outlet to warm-up (heat) the battery, and which can start the car in an extremely convenient manner.

SUMMARY OF THE INVENTION

The above and further objects and features of the invention will more fully be apparent from the following detailed description with accompanying drawings.

The car power source apparatus of the present invention is provided with a driving battery which powers the electric motor that drives the vehicle, a heater which increases the temperature of the driving battery, a control circuit which controls electric power to the heater, and a temperature sensor which detects battery temperature and outputs a detected temperature signal to the control circuit. The control circuit is provided with a timer which stores the warming-time, which is the length of time the heater is used to keep the driving battery warm after the car ignition switch has been turned off. The control circuit controls electric power to the heater to maintain the driving battery in a warmed-up state during the warming-time, which is until the timer has timed-out after the ignition switch has been switched to the off state.

The power source apparatus described above has the characteristic that while using the car in a location of extreme cold, battery warm-up (heating) does not occur after the ignition key is turned on, but rather the car starts immediately when the ignition key is turned on. This is because after the ignition switch is turned off, the power source apparatus control circuit maintains the driving battery in a warmed-up state via the heater during the warming-time until the timer has timed-out. In this patent application, the warmed-up state is the condition where battery temperature is approximately at or above a set temperature. When battery temperature is at or above the set temperature, there is no need to increase temperature by powering the heater. As described later, the set temperature for battery warm-up is approximately a constant value added to the outside air temperature to reduce load on the battery, and its maximum value is set in the range of 12° C. to 18° C. Further, in this patent application, when no specific explanation is given for the expressions "battery warm-up," "warmed-up battery," and "battery in a warmed-up condition," they imply increased battery temperature and mean battery temperature is approximately at or above the set temperature considering outside air temperature as described above.

The car power source apparatus of the present invention also has the characteristic that heater power consumption during the warming-time is reduced because the driving battery is already warmed-up when the ignition switch is turned off.

In the car power source apparatus of the present invention, the warming-time stored by the timer is preferably 12 to 36 hours.

In this power source apparatus, when returning home in the car and leaving again the next morning, the driving battery will be already warmed-up. Consequently, the car can be immediately started when the ignition switch is turned on.

In addition, the car power source apparatus of the present invention is provided with a DC/DC converter to convert driving battery voltage to the voltage supplied to the heater.

Electric power can be supplied to the heater from the driving battery via this DC/DC converter.

Preferably, the car power source apparatus of the present invention is provided with a DC/DC converter to convert driving battery voltage to the voltage supplied to the heater, an AC/DC converter to convert commercial AC power to the voltage supplied to the heater, and a switching circuit to switch between the DC/DC converter and the AC/DC converter. When power is input from a commercial power source, the switching circuit routes the supplied power to the heater via the AC/DC converter. When no commercial power is input, the switching circuit routes power from the driving battery to the heater via the DC/DC converter.

In this power source apparatus, the heater can be powered from the driving battery via the DC/DC converter or from a commercial power source via the AC/DC converter, and the output voltage of both the DC/DC converter and the AC/DC converter is the supply voltage for the heater. Since output from the DC/DC converter and the AC/DC converter can be switched to supply power to the heater, there is no need to provide special heaters for the driving battery and for commercial power, and both the driving battery and commercial power can power the same heater. With this configuration, there is no need to provide a special driving battery powered heater and commercial power heater, and the heater can be disposed compactly in an ideal location without special adaptations to provide space.

In the car power source apparatus of the present invention, a case is provided to house the driving battery, and during the warming-time of the timer, air heated by the heater can be circulated inside the case to maintain the temperature of the driving battery.

Since the power source apparatus maintains warm driving battery temperature during the warming-time by circulating heated air inside the case, the driving battery can be warmed with a very low outside air temperature while reducing heater power consumption.

Further, the power source apparatus of the present invention is disposed within two parallel planes opposite a plurality of rechargeable batteries 20, an air duct is established between opposing planes, and the heater can be disposed within that air duct.

This power source apparatus has the characteristic that heat from the heater can be efficiently used to warm the driving battery.

Further, in the car power source apparatus of the present invention, a warmed-up condition can be a state where driving battery temperature is controlled by the heater.

DETAILED DESCRIPTION OF THE INVENTION

Figure 1:
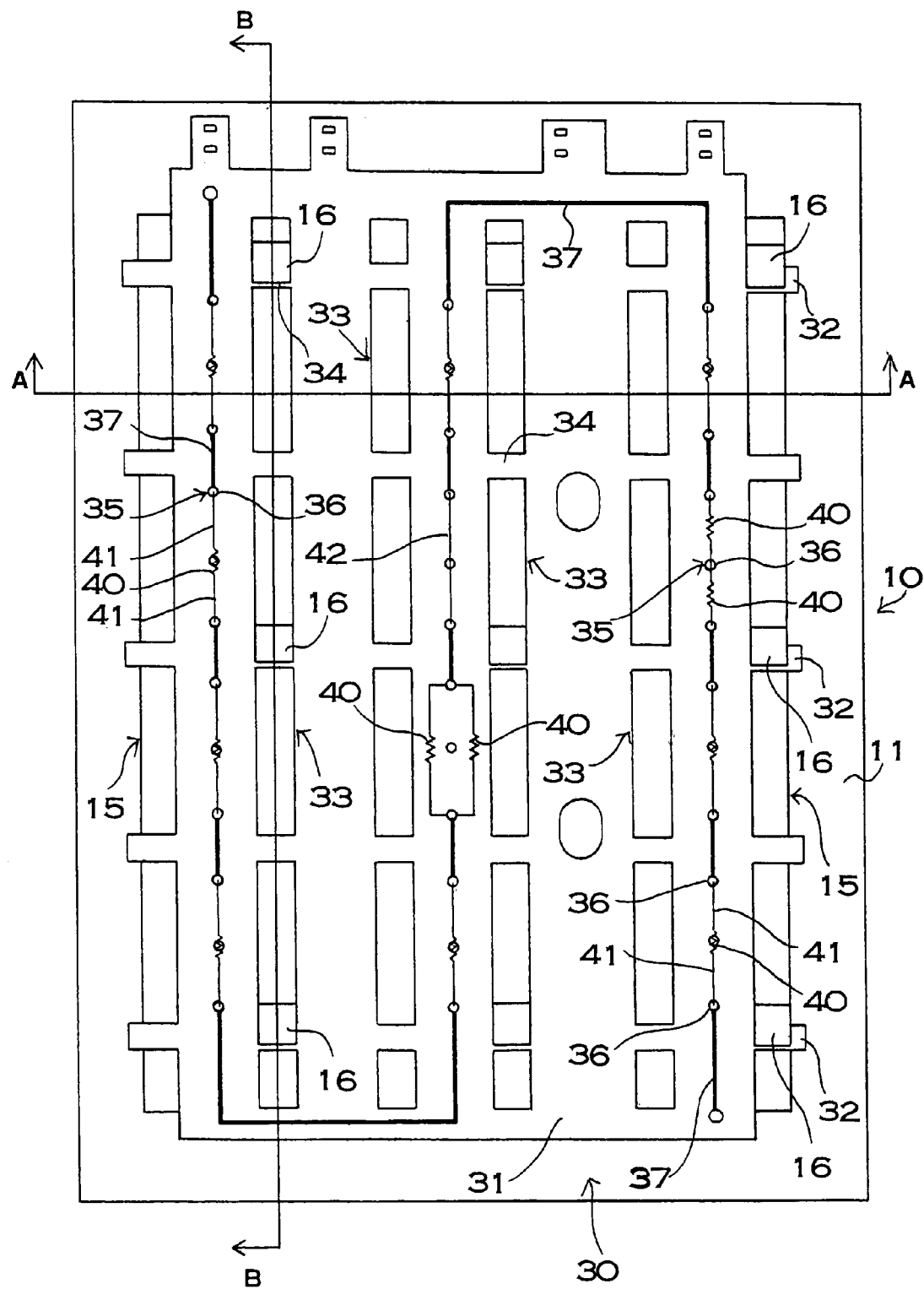
FIG. 1 is a plan view of an embodiment of a car power source apparatus of the present invention.
Figure 2:
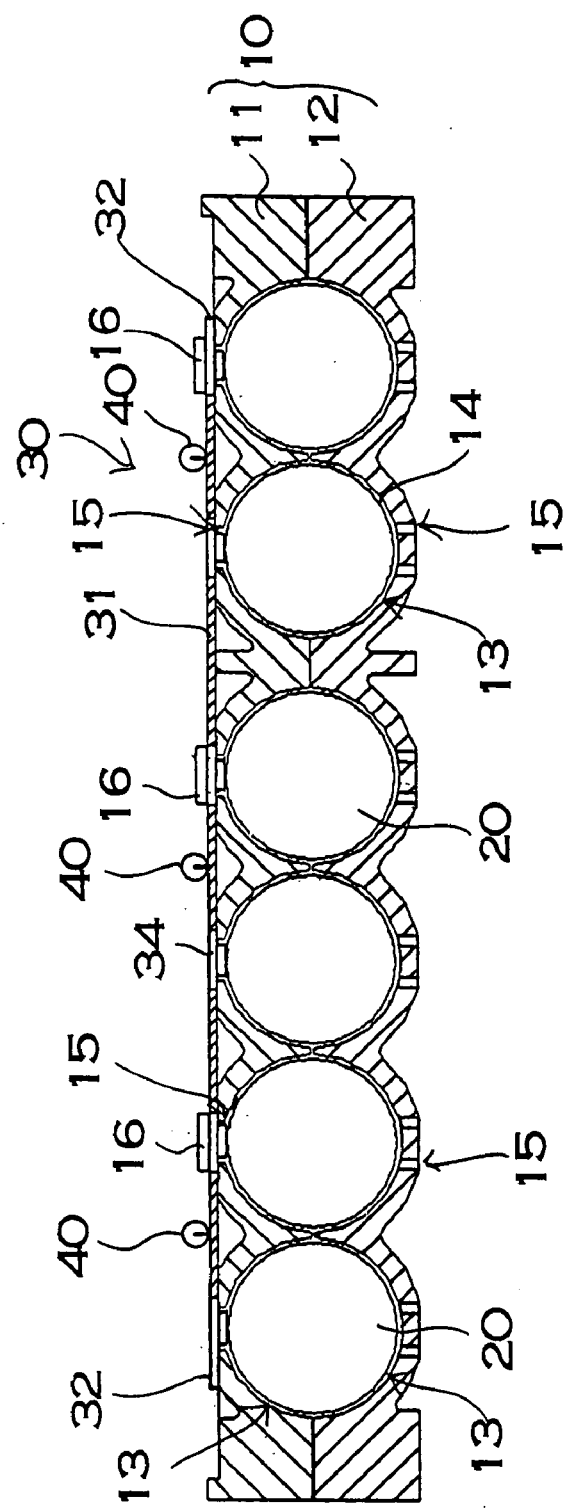
FIG. 2 is a cross-sectional view Through the line A—A on the power source apparatus shown in FIG. 1.
Figure 3:
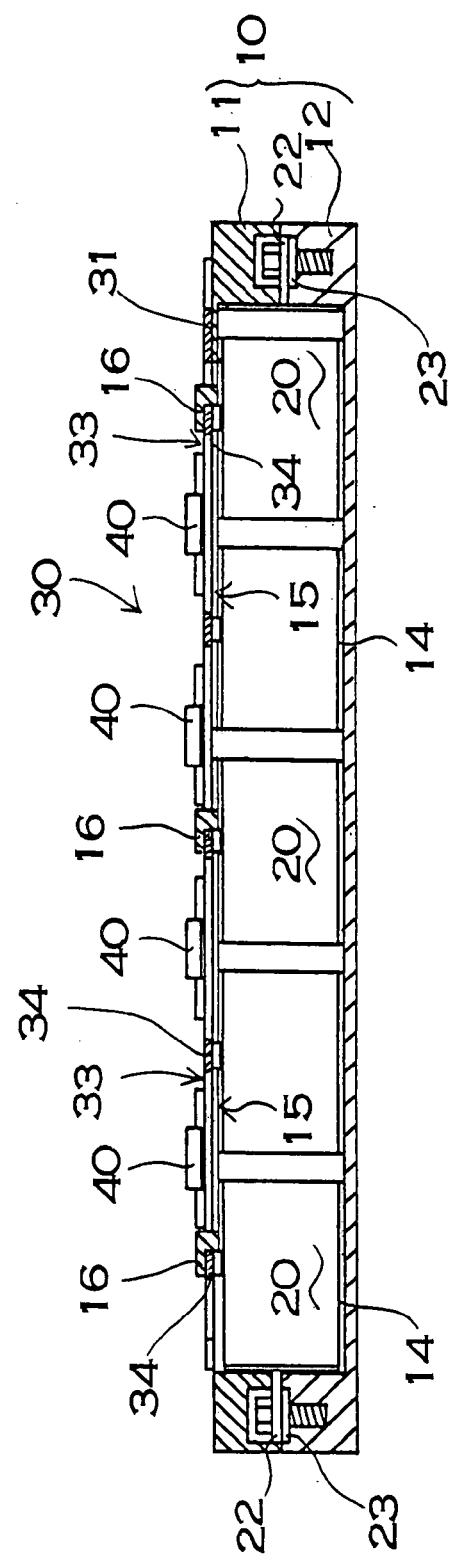
FIG. 3 is a cross-sectional view through the line B—B on the power source apparatus shown in FIG. 1.
Figure 4:
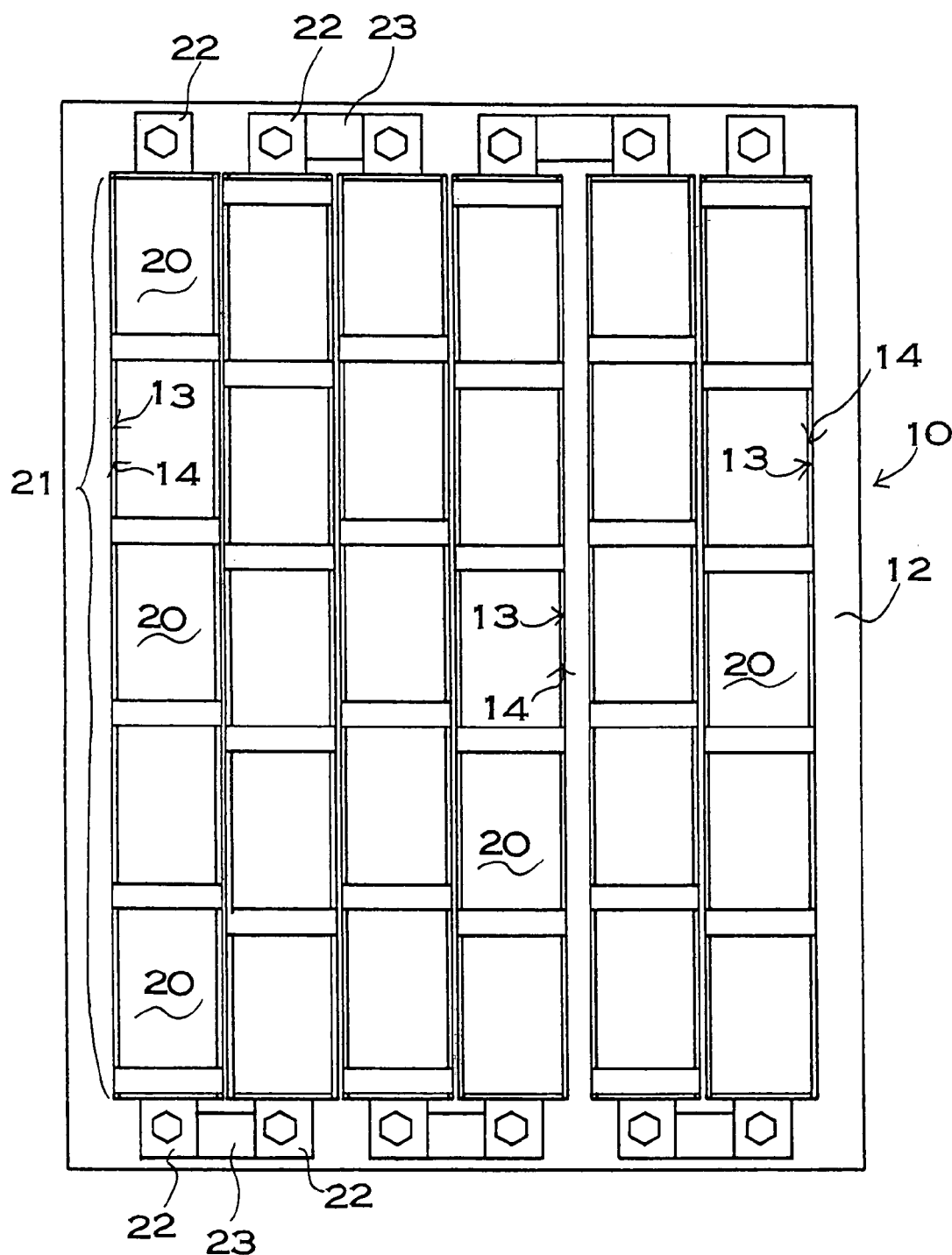
FIG. 4 is a plan view showing the power source apparatus shown in FIG. 1 with the case open.

FIGS. 1–4 show an embodiment of a car power source apparatus of the present invention. FIG. 1 is a plan view, FIG. 2 is a lateral cross-sectional view, FIG. 3 is a vertical cross-sectional view, and FIG. 4 is a plan view showing the case 10 open. This power source apparatus has a plurality of rechargeable batteries 20 arranged inside a case 10. The power source apparatus has a plurality of rechargeable batteries 20 separated into modules 21 and housed in the case 10. A battery module 21 is a plurality of series connected rechargeable batteries 20 joined in a straight-line fashion. Rechargeable batteries 20 which make up a battery module 21 are circular cylindrical nickel hydrogen batteries. However, other batteries which can be recharged, such as lithium-ion rechargeable batteries or nickel cadmium batteries, can also be used as the rechargeable batteries. Further, batteries can be rectangular batteries instead of circular cylindrical batteries.

The case 10 houses a plurality of battery modules 21 arranged parallel to each other and in the same plane. The laterally lined-up battery modules 21 are connected in series to increase output voltage. In the case 10 shown in the figures, battery modules 21 are housed between a first case 11 and a second case 12. The first case 11 and the second case 12 are provided with insertion grooves 13 to hold the battery modules 21. The interior shape of the insertion grooves is made very slightly larger than the outline of the battery modules 21. Ventilation gaps 14, which conduct air flow, are created in the case 10 between the inside surfaces of the insertion grooves 13 and the outside surfaces of the battery modules 21. In addition, ventilating holes 15 are opened through the bottom of insertion grooves 13 in the first case 11 and the second case 12. Cooled ventilating air is introduced to the case 10 from the ventilating holes 15 and allowed to flow through the ventilation gaps 14. Cooling air, which flows through the ventilation gaps 14, flows over the surfaces of the battery modules 21 to cool the battery modules 21.

Figure 5:
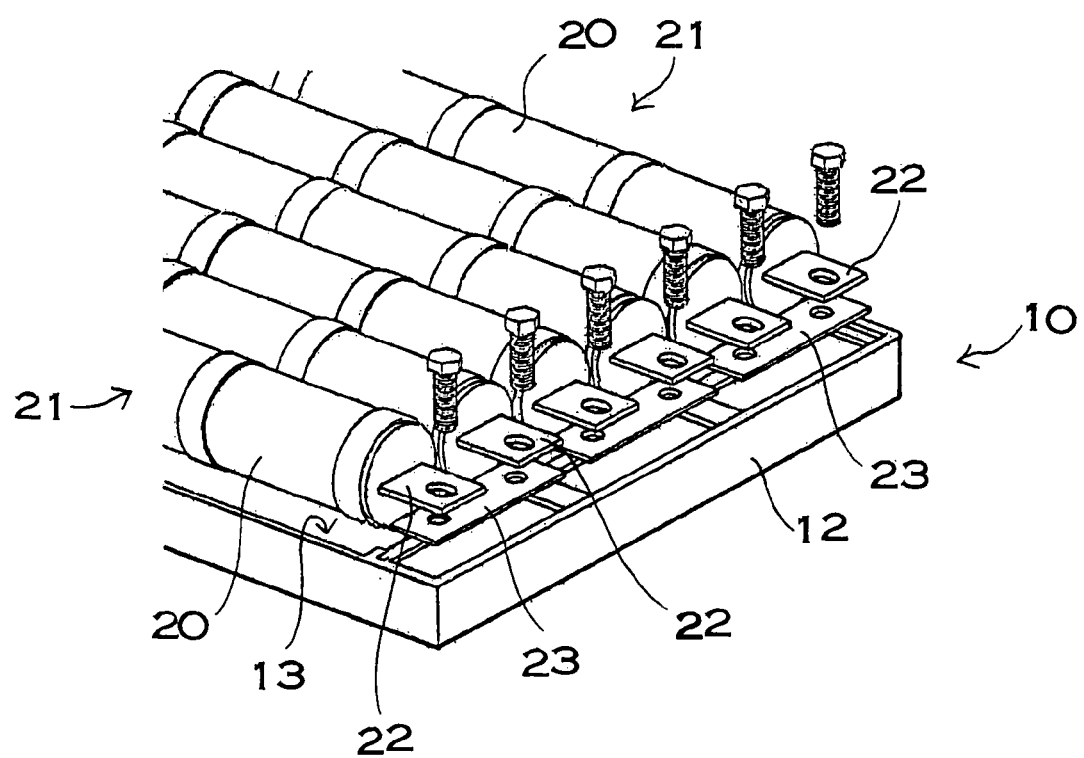
FIG. 5 is an exploded perspective view showing battery modules housed in the case.

Battery modules 21 are attached at both ends to the case 10 and disposed separated from the inside surfaces of the insertion grooves 13. Battery modules 21 have terminals 22 fixed at both ends in a manner that projects from battery end planes for connection to the case 10. This structure is shown in FIG. 5. The battery modules 21 of this figure have terminals 22 fixed perpendicular to battery end planes. Battery terminals 22 are attached with bolts to bus bars 23 that fit in prescribed positions in the second case 12. Bus bars 23 link adjacent battery modules 21 together, and electrically connect battery modules 21 in series. Bus-bars 23 and terminals 22 are sandwiched between the second case 12 and the first case 11 holding them in fixed positions. Battery modules 21 are held in insertion grooves 13 via the terminals 22. Battery modules 21 are fixed inside the case 10 in a manner that establishes ventilation gaps 14 for air passage between battery modules 21 and inside surfaces of the insertion grooves 13. In this configuration, air flowing in from the ventilating holes 15 passes through the ventilation gaps 14 to efficiently contact, and exchange heat with battery module 21 surfaces.

As shown in FIGS. 1–3, the power source apparatus is provided with a heating plate 30, on which the heater 40 for warming the rechargeable batteries 20 is mounted. A plurality of rechargeable batteries 20 are lined up parallel to each other and disposed in proximity to the surface of the heating plate 30. In the power source apparatus of the figures, the heating plate 30 is disposed on top of the first case 11, and is attached to the upper surface of the case 10. The surface of the first case 11 of the power source apparatus is disposed between the heating plate 30 and the rechargeable batteries 20 housed in the case 10. However, in the power source apparatus of the present invention, the orientation shown in these figures may be inverted disposing the heating plate below the second case, and attaching it to the bottom surface of the case which houses the rechargeable batteries.

Figure 6:
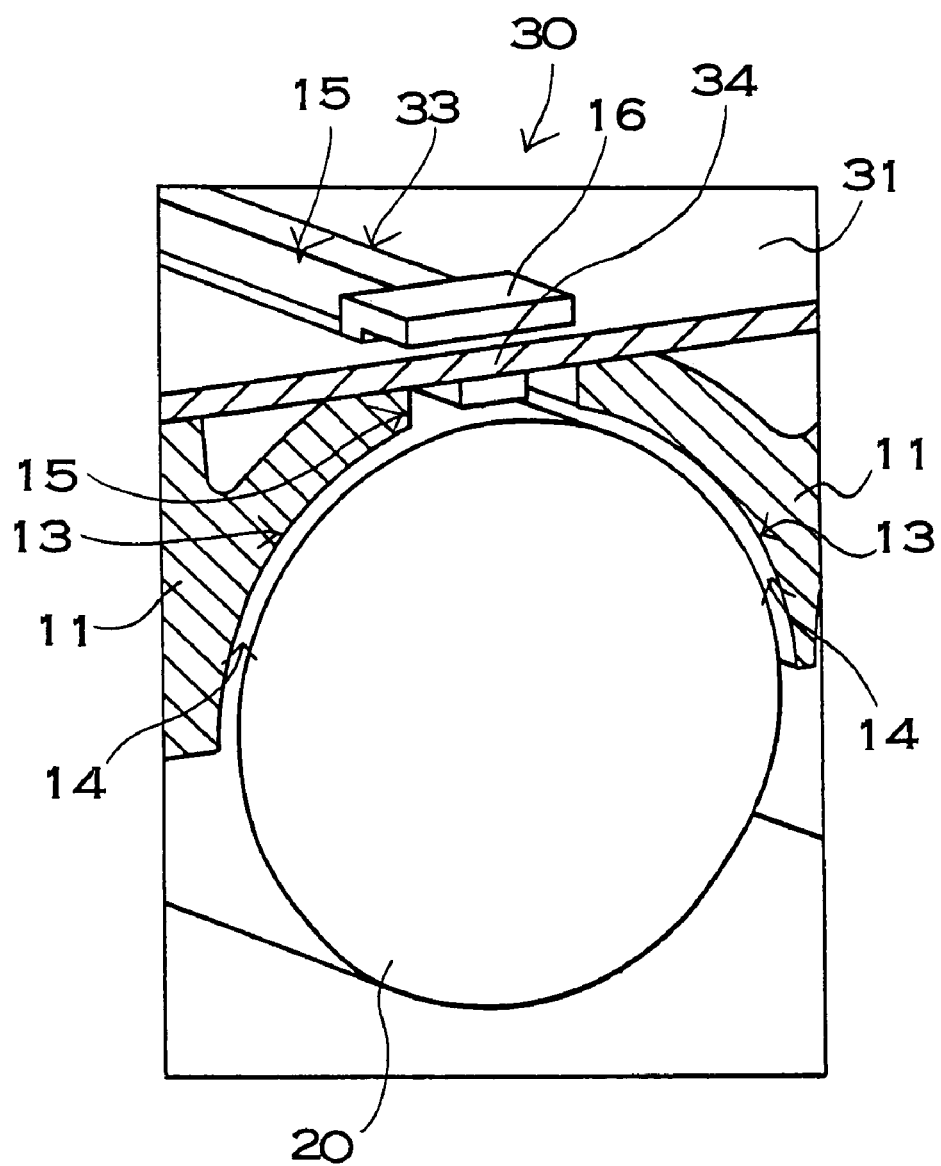
FIG. 6 is a perspective cross-sectional view showing the connecting structure of the heating plate and the case.

The heating plate 30 is provided with an insulated board 31 and a plurality of heater elements 40 mounted on that insulated board 31. As shown in the plan view of FIG. 1, the insulated board 31 is provided with projections 32 at its perimeter and connecting regions 34 between ventilation slits 33 to allow attachment to the case 10. The first case 11 has fastening hooks 16 formed as a single-piece structure to mate with perimeter projections 32 and connecting regions 34 on the insulated board 31. As shown in the plan view of FIG. 1 and the oblique cross-sectional view of FIG. 6, the heating plate 30 mounts on the first case 11 by inserting perimeter projections 32 and connecting regions 34 into the fastening hooks 16.

The first case 11 has ventilating holes 15 opened through its base, which is a wall of the case 10. The insulated board 31 of the heating plate 30 is provided with ventilation slits 33, which form continuous air passages with the ventilating holes 15. The ventilating holes 15 of the first case 11 are shaped as slits which extend in the direction of the battery modules 21. The ventilation slits 33 of the insulated board 31 are also slit-shaped openings which extend in the direction of the battery modules 21. The ventilating holes 15 of the first case 11 and the ventilation slits 33 of the insulated board 31 are open in corresponding locations, and thus the heating plate 30 does not block ventilating holes 15. Air passes through the ventilation slits 33 and ventilating holes 15 into the case 10 to cool, or warm the rechargeable batteries 20. Hot heater elements 40 on the heating plate 30 heat air, which pass through the ventilation slits 33 and ventilating holes 15 into the case 10 to warm the rechargeable batteries 20. In addition, heater elements 40 heat the heating plate 30, the heating plate 30 heats the case 10 by conduction, and the case 10 heats the rechargeable batteries 20. Although not illustrated, a power source apparatus, with the orientation shown in FIG. 2 inverted to attach the heating plate to the bottom surface of the case, can warm rechargeable batteries more efficiently because air warmed by the heating plate becomes lighter and rises through the ventilation slits and ventilating holes into the ventilation gaps.

The heating plate 30 has a plurality of heater elements 40 connected in series and mounted on the insulated board 31. Heater elements 40 are electronic parts which generate heat when powered, such as resistors, semiconductors, or PTC devices. The heating plate 30 passes current through the heater 40 to Joule heat each individual heater element 40 and warm the rechargeable batteries 20 by heat generated by the heater 40.

The heating plate 30 has ventilation slits 33 opened through the insulated board 31 and heater elements 40 are mounted between those ventilation slits 33. When the insulated board 31 is attached to the first case 11, ventilation slits 33 and ventilating holes 15 align to the same locations. A plurality of heater elements 40 are mounted on the insulated board 31 to warm the rechargeable batteries 20.

The insulated board 31 is a printed circuit board provided with a plurality of connecting holes 35 for inserting, and solder attaching wire leads 41 of heater elements 40. Connecting holes 35 have conducting rings 36 around their perimeters. Electrical connection is made between connecting hole 35 conducting rings 36 via conducting runs 37 on the printed circuit board surface in regions where no heater elements 40 are attached. No connection is made on the circuit board between connecting hole 35 conducting rings 36 where heater elements 40 are mounted. Heater elements 40 are mounted on the insulated board 31 by inserting their wire leads 41 into connecting holes and soldering the wire leads 41 to the conducting rings 36.

Heater elements 40 are solder attached to the connecting holes 35 to connect them in series. All heater elements 40 soldered to, and mounted on the printed circuit board have the same resistance value. If heater elements 40 of the same resistance are connected in series, all heater elements 40 will generate equal amounts of heat when powered. This is because the amount of heat generated is proportional to the product of the resistance and the square of the current. However, the heating plate 30 which warms a plurality of rechargeable batteries 20 is not limited to uniform heating that allows uniform heating of all rechargeable batteries 20. For example, battery modules 21 located at the periphery of the case 10 can be more easily cooled than battery modules 21 at the center. It is not important for the heating plate 30 to generate heat uniformly over its entire area, but rather it is important to warm all the rechargeable batteries 20 uniformly.

Local heating of the heating plate 30 of FIG. 1 can be adjusted by the number of heater elements 40 connected in parallel or by jumper wires 42 connected in place of heater elements 40. This is because the amount of heat generated by a resistor is determined by the product of the square of the current and the resistance value. Therefore, a jumper wire 42 can replace a heater element 40, for example, and generate no heat. Since the resistance of a jumper wire 42 is approximately 0Ω, no heat is generated regardless of current flow. In addition, the amount of heat generated can be adjusted by the number of parallel connected heater elements 40 comprising the series connected heater 40. For example, the amount of heat generated can be cut in half by connecting two heater elements 40 in parallel at a heater element mounting site. This is because heater element 40 resistance can be cut in half by connecting two heater elements 40 in parallel. Further, the amount of heat generated can be reduced to one third by connecting three heater elements 40 in parallel at a heater element mounting site. In addition, resistance and the amount of heat generated can be doubled by connecting two heater elements 40 in series at a heater element mounting site. In the heating plate 30 of FIG. 1, two heater elements 40 are connected in series to increase the amount of heat generated at the sides, and jumper wires 42 are connected in place of heater elements 40 to reduce heat generated at the center region. This allows the amount of heat generated by the heating plate 30 to be locally adjusted and it allows a plurality of rechargeable batteries 20 to be heated uniformly.

Figure 7:
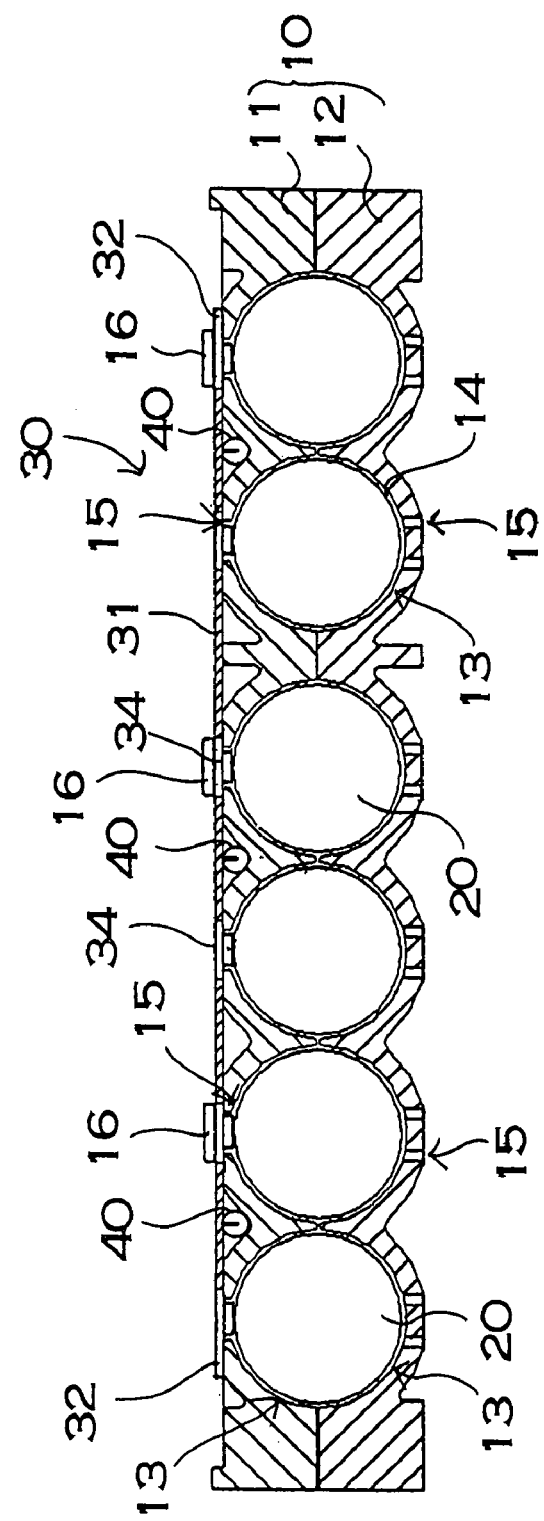
FIG. 7 is a lateral cross-sectional view of another embodiment of a car power source apparatus of the present invention.

As shown in another example in FIG. 7, heater elements 40 can also be mounted on the side of the heating plate which opposes the rechargeable batteries 20. Heater elements 40 disposed in this fashion heat the first case 11 and the first case 11 in turn heats the rechargeable batteries 20. The first case 11 of the figure takes the shape of the inside surfaces of the insertion grooves 13 which follow the contour of the surfaces of rechargeable batteries 20. The first case 11, which is heated by the heater 40, heats rechargeable batteries 20 by radiant heat or by air in the ventilation gaps 14. A power source apparatus with this structure can be installed in an automobile in a vertical disposition, or in an orientation which is inverted with respect to FIG. 7 allowing rechargeable batteries to be heated by the heating plate without using a fan. In the embodiment of this figure, structural elements which are the same as the previous embodiment are labeled with the same part number.

Figure 8:
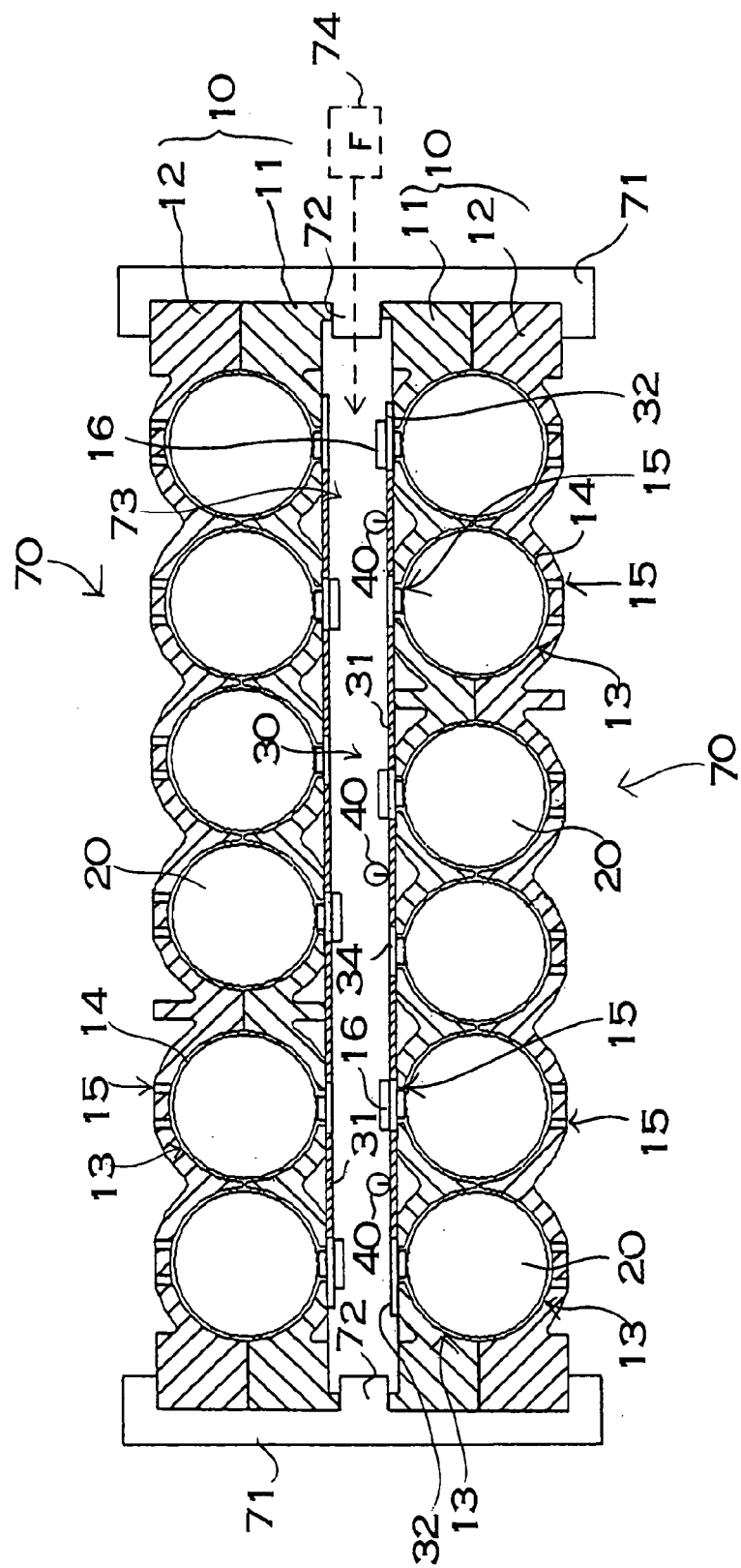
FIG. 8 is a lateral cross-sectional view of another embodiment of a car power source apparatus of the present invention.
Figure 9:
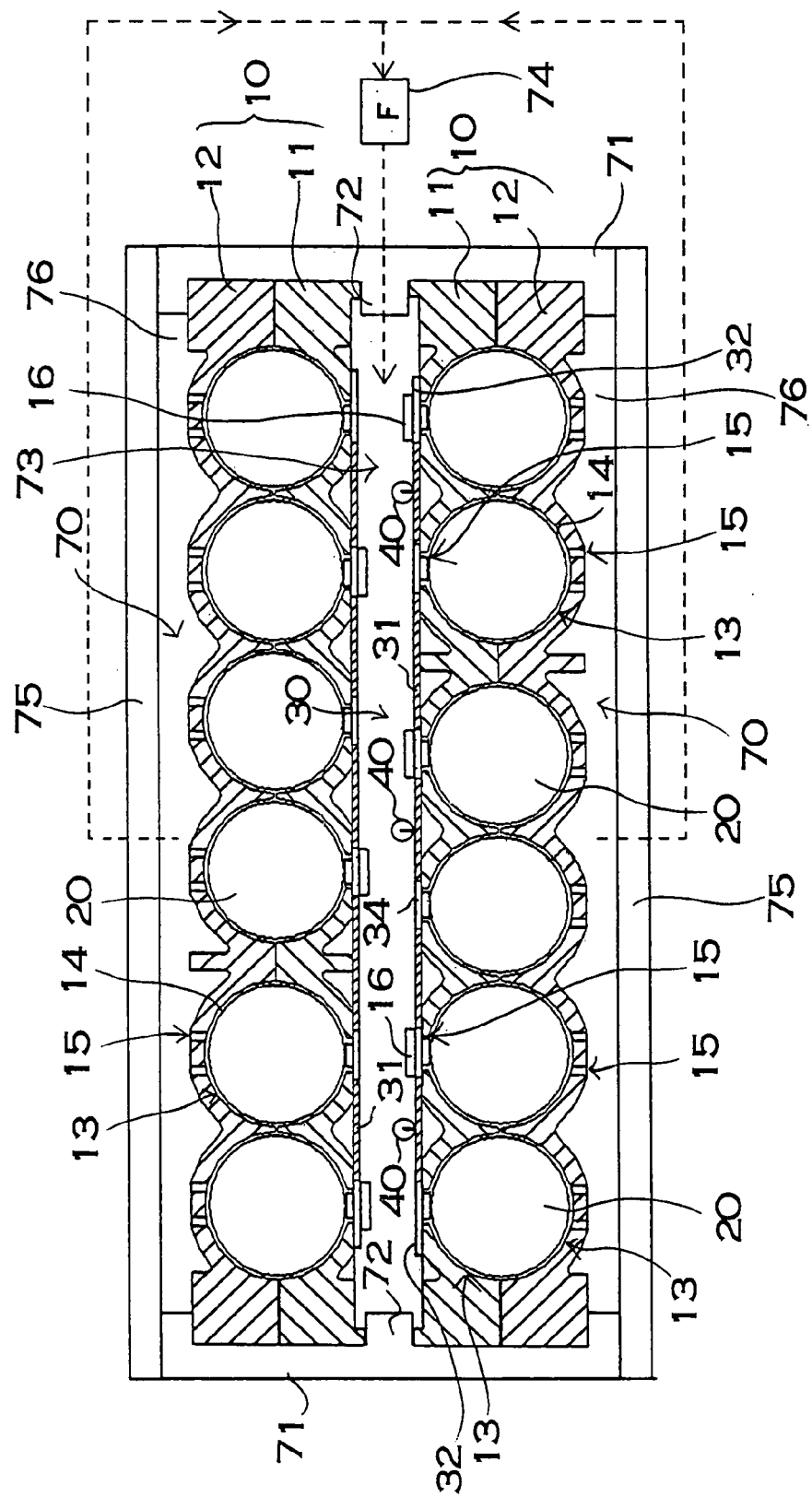
FIG. 9 is an abbreviated lateral cross-sectional view of another embodiment of a car power source apparatus of the present invention.

FIG. 8 shows a power source apparatus which uses the rechargeable batteries 20 and cases 10 cited in FIGS. 1–7. A case 10, which houses rechargeable batteries 20, is taken to be a case unit 70, and two rows of these case units 70 are stacked and joined together. FIG. 9 shows a configuration which circulates air using the power source apparatus of FIG. 8

In FIGS. 8 and 9, the bottom row case unit 70 has the same configuration as the power source apparatus shown in FIG. 2, while the top row case unit 70 is inverted with respect to the power source apparatus shown in FIG. 2. Consequently, structural elements of the embodiments of these figures, which are the same as the embodiment shown in FIG. 2, are labeled with the same part number and their description is omitted.

In the power source apparatus shown in FIGS. 8 and 9, two case units 70 are separated and disposed horizontally in two rows establishing an air duct 73 between the top row case unit 70 and the bottom row case unit 70. The two case units 70 are stacked and joined together orienting the heating plates 30 in mutual opposition. In this power source apparatus with two rows of case units 70, a plurality of rechargeable batteries 20 are disposed in two opposing parallel planes, an air duct 73 is established between those two parallel planes, and the heater 40 is disposed in that air duct 73. The two case units 70 are joined together by an external case 71. The external case 71 of the figures has alignment projections 72 in the center region to hold the two case units 70 with a prescribed gap between them. Thickness of the alignment projections 72 of the external case 71 is set for optimum gap size between the two case units 70. External case components 71, 71 are approximately rectangular boards of resin material, and are disposed on the left and right sides of the page in reference to the power source apparatus shown in FIG. 1. This configuration of power source apparatus heats the air duct 73 via the heater 40, and in turn heats rechargeable batteries 20 above and below via the air duct 73. The heater 40 in the air duct 73 heats both the air in the air duct 73 and the cases 10 to heat the rechargeable batteries 20. The air duct 73 is not air-tight, but it is an enclosed space. As a result, a heater 40, which heats this air duct 73, efficiently heats rechargeable batteries 20 via the air and through the cases 10.

In the power source apparatus of FIGS. 8 and 9, a heating plate 30 is attached to the upper surface of the case unit 70 disposed in the bottom row. In addition, the heating plate 30 of the top row case unit 70 of the power source apparatus of the figures is not provided with a heater 40. Rechargeable batteries 20 housed in the top row case unit 70 are heated by the heater 40 mounted on the heating plate 30 on the bottom row case unit 70. A power source apparatus, which has a heater 40 on only one of the heating plates 30, has the characteristic that many rechargeable batteries 20 can be effectively heated while reducing the number of heaters 40 and more specifically the amount of energy consumption. In particular, a configuration disposing the heater 40 on the bottom row heating plate 30, efficiently heats rechargeable batteries 20 housed in the bottom row case unit 70 via heat conducted from the bottom row heating plate 30 to the first case 11. Rechargeable batteries 20 housed in the top row case unit 70 are efficiently heated by heated air, which becomes lighter and rises to flow through top row ventilation slits 33 and ventilating holes 15. Consequently, all rechargeable batteries can be efficiently and uniformly heated with low power consumption. However, the heater can also be disposed on the heating plate on the top row case unit, or heaters can be disposed on heating plates on both the top and bottom row case units. Further, as shown by the broken line arrows indicating air flow paths in the figures, air heated by the heating plate 30 can be induced to flow and heat rechargeable batteries 20 via a fan 74 (labeled F in figures). After heating the rechargeable batteries 20, air is discharged through the ventilating holes 15 located at the top and bottom of the power source apparatus. Although not illustrated, openings such as through-holes are established through the external case 71 at one end where a broken line arrow indicates air flow from the fan 74 through the external case 71.

The power source apparatus of FIG. 9 takes the shape of unit box, and air heated by the heating plate 30 is circulated inside the cases 10 to heat the rechargeable batteries 20. Plates 75, 75, which are roughly rectangular boards of resin material, are disposed on both the top and bottom of the power source apparatus. In addition, end plates 76, which are disposed at the top and bottom of the page in reference to the power source apparatus shown in FIG. 1, enclose air flow paths for the apparatus shown in FIG. 9. As shown in FIG. 9, a power source apparatus which circulates heated air via a fan 74 efficiently warms rechargeable batteries 20 by circulating air heated by the heater 40 in a closed loop (air flow paths shown by broken lines in the figure). Air discharged from top and bottom row ventilating holes 15 in the apparatus of FIG. 9 pass through openings provided in the top and bottom plates 75, 75. Although not illustrated and abbreviated in structural detail, openings in the top and bottom plates 75, 75 return the discharged air to the intake side of the fan 74. It is not necessarily a requirement to mount the power source apparatus in a horizontal fashion in an automobile. The apparatus can also be mounted in an automobile in a vertical or inclined orientation. A power source apparatus with a fan 74 that circulates air heated by the heating plate 30 can effectively heat rechargeable batteries 20 regardless of its orientation in the automobile. Further, air flow paths described for FIGS. 8 and 9 can be used not only when heating rechargeable batteries 20 via the heater 40, but also can be used as cooling air paths for cooling rechargeable batteries 20.

Figure 10:
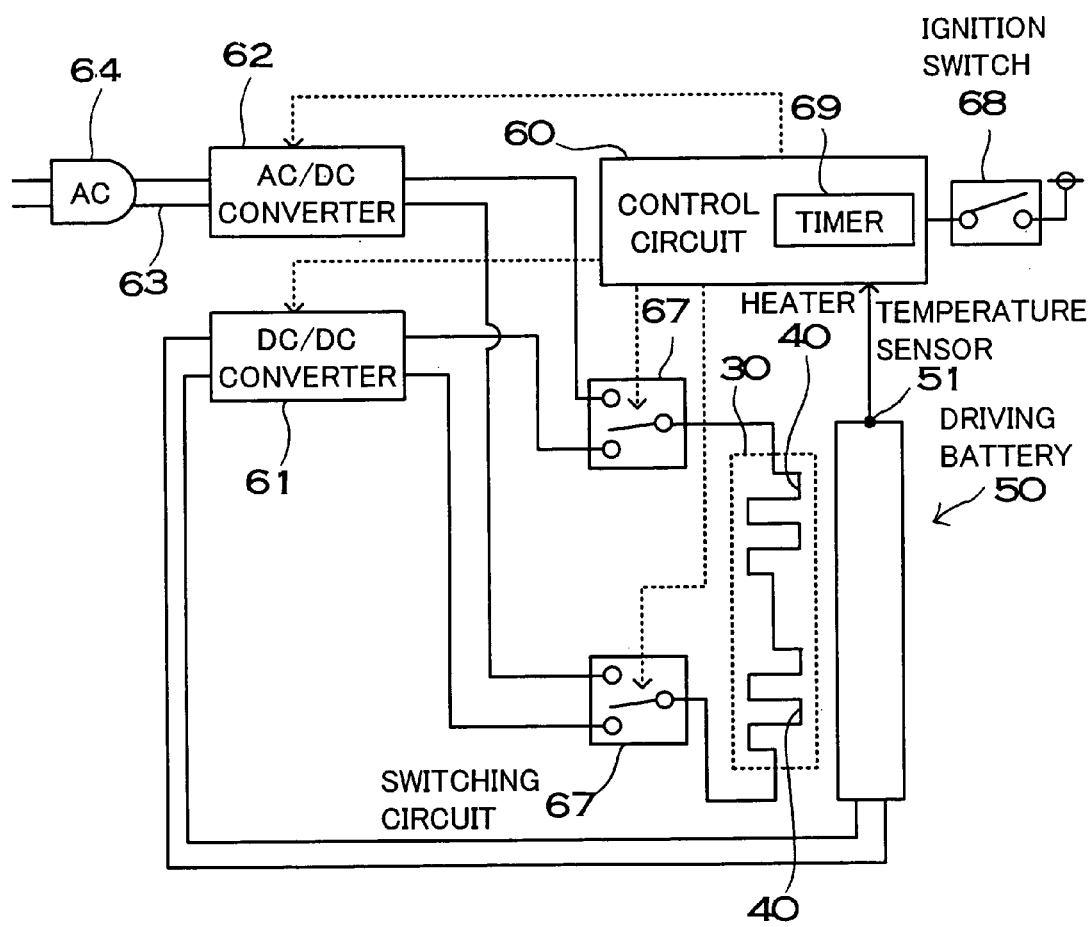
FIG. 10 is a block diagram of an embodiment of a car power source apparatus of the present invention.

FIG. 10 shows a block diagram of the power source apparatus. This power source apparatus is provided with a DC/DC converter 61 to convert driving battery 50 voltage to heater supply voltage; an AC/DC converter 62 to convert commercial power to heater supply voltage; a switching circuit 67 to switch between the DC/DC converter 61 and the AC/DC converter 62; a control circuit 60 to control the switching circuit 67, the DC/DC converter 61, and the AC/DC converter 62; and a temperature sensor 51 to detect battery temperature and issue a detected temperature signal to the control circuit 60.

The control circuit 60 is provided with a timer 69 that stores a warming-time, which is the time the driving battery 50 is maintained in a warmed-up condition via the heater 40 from the time the car ignition switch 68 is turned off. In this control circuit 60, the timer 69 begins counting when the ignition switch 68 is turned off. During the warming-time after the timer 69 has begun counting until time-out, the control circuit 60 controls power to the heater 40 to maintain the driving battery 50 in a warmed-up condition. Therefore, when battery temperature drops below a set temperature, the heater 40 is powered and the driving battery 50 is heated. Thus the warmed-up condition above means the heater 40 maintains battery temperature in a controlled state.

The warming-time stored in the timer 69 is set, for example, at 24 hours. If warming-time is set to this value, the car can be left unused for one day, then since the driving battery 50 remains warmed-up, the car can be immediately started the next day without warm-up. However, warming-time can also be set from 12 hours to 36 hours. Further, depending on the car use pattern, warming-time can also be set less than 12 hours or longer than 36 hours. If timer 69 warming-time is long, the car can be immediately started without warm-up even after a long period of non-use. However, in an apparatus which powers the heater 40 via the driving battery 50, the amount of driving battery 50 discharge increases when warming-time is made longer. To prevent over-discharge of the driving battery 50, the control circuit 60 monitors remaining capacity of the driving battery 50 while controlling power to the heater 40. If remaining capacity of the driving battery 50 drops to a minimum discharge capacity, the control circuit 60 stops powering the heater 40 to halt discharge of the driving battery 50. In the case where the heater 40 is powered by commercial power, the heater 40 maintains the driving battery 50 in a warmed-up condition until the time set on a commercial power timer (not illustrated) times-out. The set time of the commercial power timer is shorter than the warming-time of the timer 69, and for example, is 2 hours. Since driving battery 50 warm-up via commercial power does not discharge the driving battery 50, the heater 40 can maintain the driving battery 50 in a warmed-up condition until the warming-time of timer 69 times-out, or until the next time the car is started.

When commercial power is input to the power source apparatus of FIG. 10, the control circuit 60 controls the switching circuit 67 to switch to the AC/DC converter 62 and supply power to the heater 40 via the AC/DC converter 62. When commercial power is not input, the control circuit 60 controls the switching circuit 67 to switch to the DC/DC converter 61 and supply power to the heater 40 from the driving battery 50 via the DC/DC converter 61. When the driving battery 50 is warmed-up (heated) via the DC/DC converter 61, the battery can be quickly and efficiently warmed-up (heated). This is because in addition to being heated by the heater 40 on the heating plate 30, the driving battery 50 is also self-heated by discharge of the rechargeable batteries 20.

The AC/DC converter 62 connects to household commercial power via a power cord 63 to a commercial power outlet 64. This power source apparatus heats the heater 40 via externally input commercial power.

The control circuit 60 detects battery temperature from a signal input from the temperature sensor 51, and controls heater 40 power on and off. The temperature sensor 51 is, for example, a thermistor. A thermistor detects temperature as a change in resistance, and inputs this to the control circuit 60. When temperature detected by the temperature sensor 51 is lower than a set temperature, the control circuit 60 powers the heater 40 to warm the driving battery 50.

During the warming-time of the timer 69 and when the ignition switch 68 is turned on after the timer 69 has timed-out, the control circuit 60 detects battery temperature and powers the heater 40 if detected temperature is lower than the set temperature. After the warming-time of the timer 69 has timed-out and the ignition switch 68 is in the off state, the heater 40 is not powered even if battery temperature is lower than the set temperature. In addition, even when the ignition switch 68 is in the on state, if remaining capacity of the driving battery 50 is less than a set capacity, the heater 40 will not be powered even if battery temperature is lower than the set temperature. This is to prevent over-discharge of the driving battery 50. When the driving battery 50 is charged and its remaining capacity is greater than a set capacity, the heater 40 will be powered to warm-up (heat) the driving battery 50.

Figure 11:
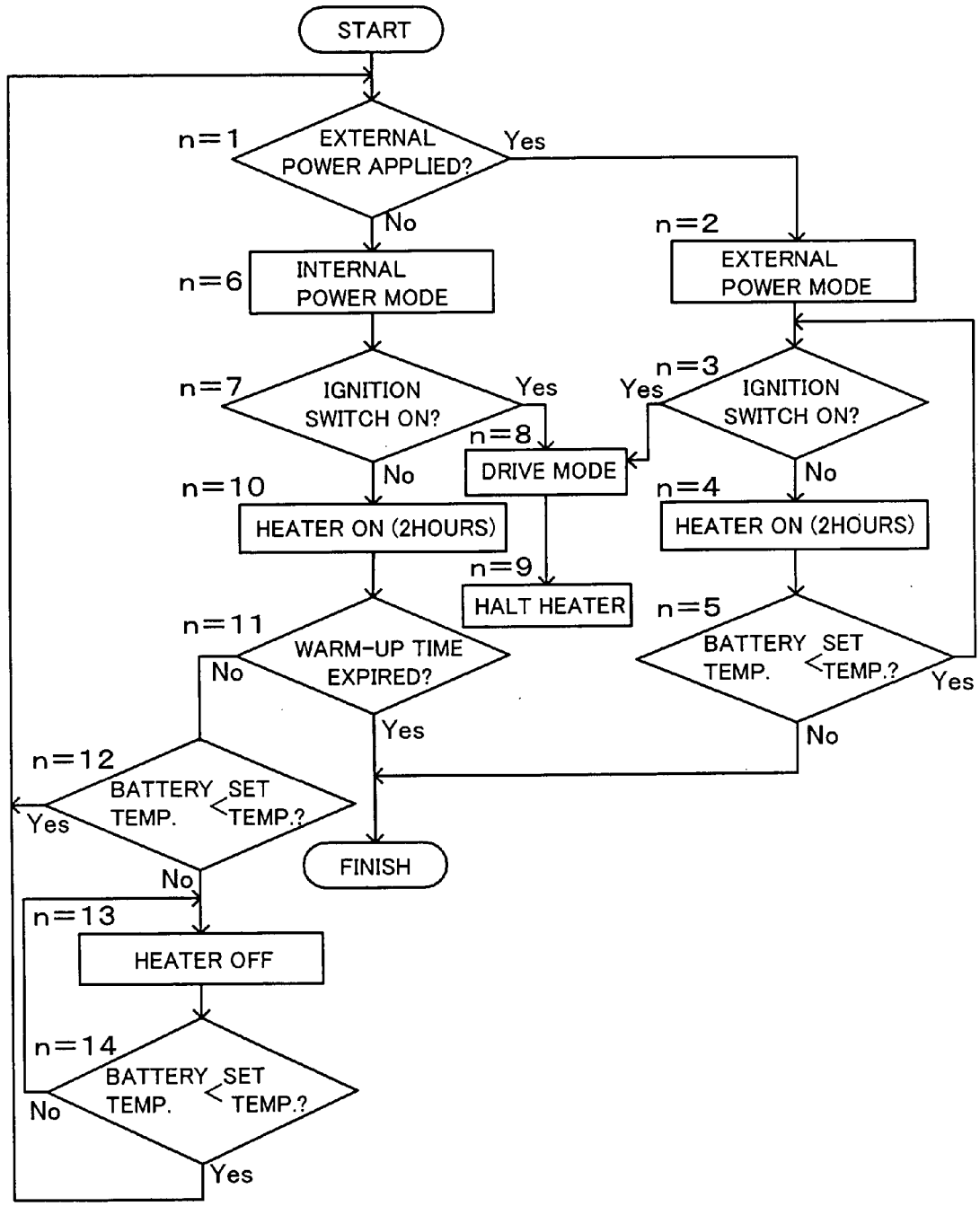
FIG. 11 is a flow-chart showing steps to warm-up rechargeable batteries of an embodiment of a car power source apparatus of the present invention.

The power source apparatus described above warms rechargeable batteries 20 during the warming-time of the timer 69 according to the flow-chart shown in FIG. 11 and described below.

[Step n=1]

Determine whether or not external power is applied, specifically, whether or not commercial power is input.

[Step n=2]

If commercial power is input, set the mode to external power mode. In this mode, the switching circuit 67 connects the AC/DC converter 62 to the heater 40, and disconnects the DC/DC converter 61.

[Step n=3]

In this mode, determine whether the ignition switch 68 (key) is on or not. If the ignition switch 68 is on, jump to step n=8 and set the mode to drive mode.

[Step n=4]

If the ignition switch 68 is not on, turn the heater 40 on to warm-up (heat) the driving battery 50 for 2 hours (commercial power timer set time).

[Step n=5]

When the commercial power timer times-out (2 hours), compare battery temperature with the commercial power set temperature setting approximately 15° C. to 20° C., and jump to step n=3 if battery temperature is less than the set temperature. Finish if battery temperature is higher than the set temperature.

[Step n=6]

If commercial power is not input, specifically if external power is not applied, set the mode to internal power mode at this step. For internal power mode, connect the DC/DC converter 61 to the heater 40, and supply power to the heater 40 from the driving battery 50.

[Step n=7]

At this step, determine whether the ignition switch 68 (key) is on or not.

[Step n=8, 9]

If the ignition switch 68 is on, set the mode to drive mode and halt heater 40 operation.

[Step n=10]

If the ignition switch 68 is not on, turn the heater 40 on and warm-up (heat) the driving battery 50 for 2 hours (set time for the heater timer).

[Step n=11]

When the set time of the heater timer, which is 2 hours, has elapsed, determine if the warming-time of the timer 69 has expired. This timer begins counting when the ignition switch is turned off. Finish if the warming time of the timer 69 has expired.

[Step n=12]

If the warming-time of the timer 69 has not expired, compare battery temperature with the set temperature in this step. If battery temperature is lower than the set temperature, jump to step n=1, loop through steps n=1, 6, 7, 10, and 11, and continue to warm-up (heat) the driving battery 50 until the warming time expires.

In the case where heating is provided by power from the driving battery 50, the set temperature is determined as follows. Temperature outside the driving battery 50 is measured by a separately provided external air temperature sensor, and the set temperature is determined by adding approximately 10° C. to 15° C. to the measured external air temperature. The maximum value of the set temperature is fixed at approximately 15° C. (set within a range from approximately 12° C. to 18° C.). Even if battery temperature does reach the set temperature, heating is suspended if driving battery 50 remaining capacity drops below a set value.

[Step n=13, 14]

If battery temperature is not lower than the set temperature, specifically if battery temperature is higher than the set temperature, turn off power to the heater 40. Subsequently, loop through steps n=13 and 14 until battery temperature becomes lower than the set temperature. When battery temperature becomes lower than the set temperature, jump to step n=1 and warm-up (heat) the driving battery 50.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

This application is based on application No. 2004-105915 filed in Japan on Mar. 31, 2004, the content of which is incorporated hereinto by reference.

What is claimed is:

1. A car power source apparatus comprising:
 a driving battery which powers an electric motor to drive a car;
 a heater for heating the driving battery;
 a control circuit for controlling power to the heaters; and
 a temperature sensor for detecting the battery temperature and issuing a detected temperature signal to the control circuit,
 wherein the control circuit is provided with a timer which stores a warming-time to maintain the driving battery in a warmed-up condition via the heater after the car ignition switch has been turned off; and
 wherein, during the warming-time, which is a period of time measured from the time the ignition switch is turned to the off state until the timer times-out with the ignition switch turned to the off state, the control circuit controls power to the heater to maintain the driving battery in a warmed-up condition.

2. A car power source apparatus as recited in claim 1 wherein the warming-time stored in the timer is 12 hours to 36 hours.

3. A car power source apparatus as recited in claim 1 wherein a DC/DC converter is provided to convert driving battery voltage to heater supply voltage so that power can be supplied to the heater from the driving battery via the DC/DC converter.

4. A car power source apparatus as recited in claim 3 wherein a DC/DC converter is provided to convert driving battery voltage to heater supply voltage, an AC/DC converter is provided to convert commercial power to heater supply voltage, and a switching circuit is provided to switch between the DC/DC converter and the AC/DC converter;
 when commercial power is input, the switching circuit switches to supply power to the heater via the AC/DC converter; and when commercial power is not input, power is supplied to the heater from the driving battery via the DC/DC converter.

5. A car power source apparatus as recited in claim 1 wherein a case is provided to house the driving battery, and during the warming-time of the timer, air heated by the heater is circulated inside the case to warm the driving battery.

6. A car power source apparatus as recited in claim 1 wherein a plurality of rechargeable batteries are disposed in two opposing parallel planes, an air duct is established between the two opposing planes, and the heater is disposed in the air duct.

7. A car power source apparatus as recited in claim 1 wherein the warmed-up condition is the driving battery condition when it is temperature controlled by the heater.

8. A car power source apparatus as recited in claim 1, wherein the control circuit is operable to monitor remaining capacity of the driving battery while controlling power to the heater, and if remaining capacity of the driving battery drops to a minimum discharge capacity, the control circuit is operable to stop power to the heater to halt discharge of the driving battery.

* * * * *